United States Patent Office 2,767,218
Patented Oct. 16, 1956

2,767,218
4-NITRO-α-METHOXYSTYRENE

Joseph M. Wilkinson, Easton, George W. Pedlow, McElhattan, and Robert W. Wynn, Easton, Pa., assignors to General Aniline & Film Corporation, New York, N. Y., a corporation of Delaware No Drawing. Original application July 11, 1950, Serial No. 173,225, now Patent No. 2,619,505, dated November 25, 1952. Divided and this application May 28, 1952, Serial No. 290,578

1 Claim. (Cl. 260—611)

This invention relates to 4-nitro-α-methoxystyrene.

p-Nitroacetophenone prepared by a previous method involves the acylation of the sodium or the magnesium methoxy or ethoxy derivative of diethylmalonate with p-nitrobenzoyl chloride. The resulting dimethyl- or diethyl-acylmalonate was hydrolyzed and decarboxylated in the presence of glacial acetic and sulfuric acids by the usual method for the ketonic cleavage of certain β-keto esters.

It has also been prepared by the hydration of p-nitrophenyl propiolic acid followed by decarboxylation, condensation of nitrobenzoyl chloride with acetoacetic ester followed by hydrolysis or decarboxylation, by the air oxidation of p-nitroethylbenzene in the presence of ($CrO_3$) at 145° C., by the nitration and subsequent oxidation of methylphenylcarbinol, and by treatment of p-nitroethylbenzene with t-butylnitrite and sodium t-butoxide followed by hydrolysis of the resulting oxime.

All of the foregoing methods are involved, time consuming, and use relatively expensive and sometimes unavailable chemicals. In addition, unsatisfactory conversions are obtained in the synthesis.

It is an object of the present invention to provide 4-nitro-α-methoxystyrene.

Other objects and advantages will become apparent from the following description.

The foregoing objects are accomplished by reacting styrene with chlorine and methanol, either in the presence or absence of an acid binding agent, at a temperature of —5° to 5° C. for a time sufficient to permit the equivalent weight of chlorine to be absorbed. During the reaction, which takes about 4 hours, a mixture consisting of about 70% of α-(chloromethyl)-benzyl methyl ether and 30% of styrene dichloride is formed. The latter which is an impurity, need not be isolated, and the mixture as such is nitrated to yield α-(chloromethyl)-4-nitrobenzylmethyl ether, and o- and m-isomers, and nitration products of styrene dichloride. The mixture of the nitro-isomers is then dehydrochlorinated by heating, preferably under reflux, with an alcoholic solution of sodium or potassium hydroxide to yield 4-nitro-α-methoxystyrene, o- and m-isomers, and products from nitrated styrene dichloride.

The 4-nitro-α-methoxystyrene is separated by simply cooling and filtering the crude nitrated reaction mixture after the sodium or potassium chloride is removed. 4-Nitro-α-methoxystyrene is new and constitutes a part of our invention.

The process steps involved with bromination of the final product are illustrated by the following schematic equation. The bracketed compounds are not isolated.

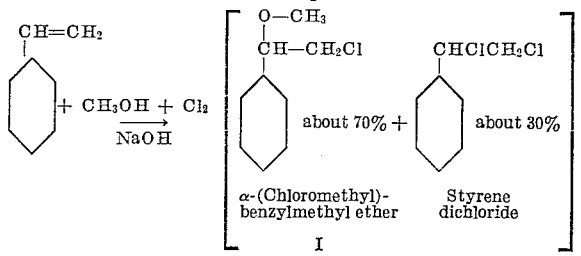

(A)

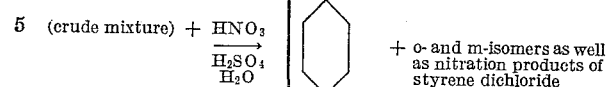

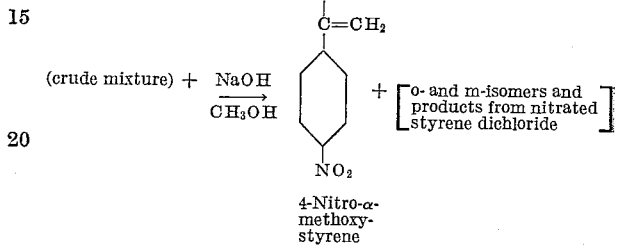

4-Nitro-α-methoxystyrene

III

The nitration (A) of either the distilled α-(chloromethyl)-benzylmethyl ether (I) or the crude mixture of α-(chloromethyl)-benzylmethyl ether and styrene dichloride to yield α-(chloromethyl)-4-nitrobenzylmethyl ether (II) is carried out by employing only slightly more than the theoretical amount of mixed nitric acid consisting of approximately 30% of nitric acid, 60% of sulfuric acid, and 10% of water by weight. Appreciable variations of this composition result in lower yields of the product. The actual amount of nitric acid in the mixed nitric acid mixture should be such as to nitrate the α-(chloromethyl)-benzylmethyl ether as such or in admixture with styrene dichloride.

The nitration reaction is quite exothermic, and it is preferable that it be carried out at a temperature ranging from —5° to 5° C. for a period of time ranging from ½ to 2 hours. However, the reaction may be carried out at higher or lower temperatures. Higher temperatures result in lower yield of product, and lower temperatures prolong the reaction time. The use of 100% sulfuric acid as diluents in the mixed acid nitration decomposes α-(choloromethyl)-benzylmethyl ether with the formation of a gummy substance, presumably a polymer. With 77% sulfuric acid as a diluent, a low yield is obtained. With 77% nitric acid alone, an impure product was obtained.

For practical commercial purposes, it is preferable to nitrate the crude mixture since it eliminates the fractional distillation of substantially pure α-(chloromethyl)-benzylmethyl ether from the chlorinated reaction mixture.

A further improvement in the foregoing process steps is in the method (B) of isolating 4-nitro-α-methoxystyrene as a new product.

In the process referred to in the aforementioned patent, it is necessary to add water at the end of the dehydrochlorination step to yield 4-nitro-α-methoxystyrene in the form of a precipitate of a semicrystalline mass which had to be reslurried in fresh alcohol. According to the present process, this new product is isolated by filtering the sodium chloride from the hot methanol solution and then cooling and filtering the product followed by washing with a little fresh methanol. The 4-nitro-α-methoxystyrene is obtained in excellent purity from a highly contaminated reaction mixture containing a minimum of about six products.

Preparation of α-(chloromethyl)-benzylmethyl ether

To a solution of 96 grams of sodium hydroxide in 100 mls. of methanol, 208 grams of commercial styrene were added and the resulting solution chilled to —5° to 0° C. Chlorine gas was passed into the mixture with stirring at the same temperature until about 162 grams of chlorine had been absorbed which took about 3 to 3½ hours. The amount of chlorine may vary between 155 to 162 grams. Throughout the reaction the pH of the chlorination mixture remained above 10 and the addition of chlorine was discontinued when the pH reached 6 to 7.

The copious white precipitate was filtered off and washed once with methanol. The absence of hypochlorite was verified with acidified potassium iodide solution. If the filtrate at this point is slightly alkaline (pH of 7 to 8), it should be brought back to a pH of 5 to 6 with a small amount of hydrochloric acid. The methanol was stripped off through a column at atmospheric pressure until two layers, one alcohol, and one oil, were formed in the reaction vessel. (About 90 to 95% of methanol was removed.) The layers were separated and the oily product washed with water to remove the dissolved methanol and sodium chloride.

There were obtained between 315 to 317 grams of a crude product which amounts to a yield of 92–93% of theory.

From methoxyl determinations of the crude products, a 70–75% content of α-(chloromethyl)-benzylmethyl ether was indicated. The crude mixture was nitrated in the following manner.

Nitro-isomers 85 grams of the crude mixture were cooled in an acetone-Dry Ice bath to 0° C. The temperature was maintained between 0° to —3° C. 102 grams of an acid nitration mixture (33.3% nitric acid, 66.7% of sulfuric acid) and 11.2 grams of water were added dropwise over a ¾ to 1 hour period. After the addition was completed, the nitrated mixture was stirred at 0° to —3° C. for 1¾ to 2 hours when it became quite viscous. The viscous mixture was then poured into 500 grams of water with stirring. The oily layer was separated from the water layer and washed with two 300-gram portions of warm water (40–45° C.). The oily layer is then dehydrochlorinated in the following manner.

Dehydrochlorination

To 198 grams of methanol 25 grams of sodium hydroxide were added with stirring. After the heat of the solution had subsided, the solution was cooled to 40 to 45° C. and the oil obtained above added in a steady stream, which took about 15 minutes' time. The mixture was refluxed for about 45 minutes, the sodium chloride filtered from the hot solution, and the salt cake washed with 40 grams of hot methyl alcohol. The filtrate was cooled to 5° C. and held at this temperature for 15 minutes. The precipitated product was filtered and washed with 40 grams of methyl alcohol cooled to 5° C.

A yield of 33.2 to 35 grams, 37–39% of the theoretical yield, of dried 4-nitro-α-methoxystyrene, melting at 83 to 84.5° C., was obtained.

This application is a division of our application Serial No. 173,225, filed on July 11, 1950, now United States Patent 2,619,505 issued November 25, 1952.

We claim:

4-nitro-α-methoxystyrene characterized by the following formula:

References Cited in the file of this patent

Ingold et al., Jour. Chem. Society, London, vol. 127 (1925) pgs. 870–875.

Brubacher, Chem. Abst. 44, pg. 5830 (1950).